No. 746,963. PATENTED DEC. 15, 1903.
F. HOOKER.
CLOTHES WRINGER.
APPLICATION FILED MAY 13, 1902.
NO MODEL.
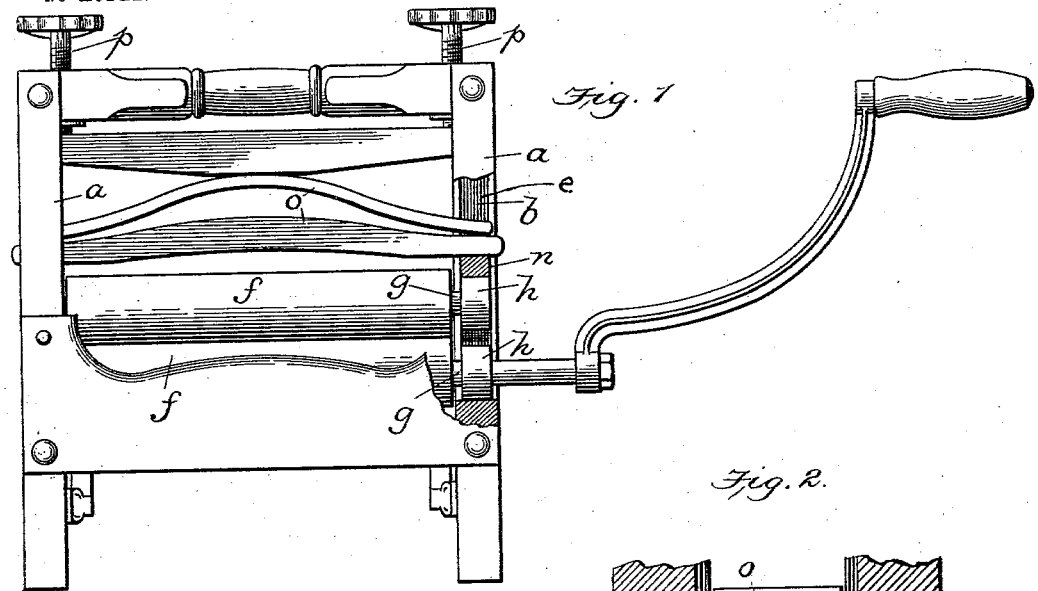
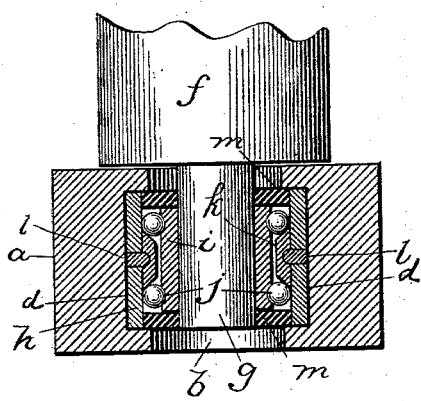
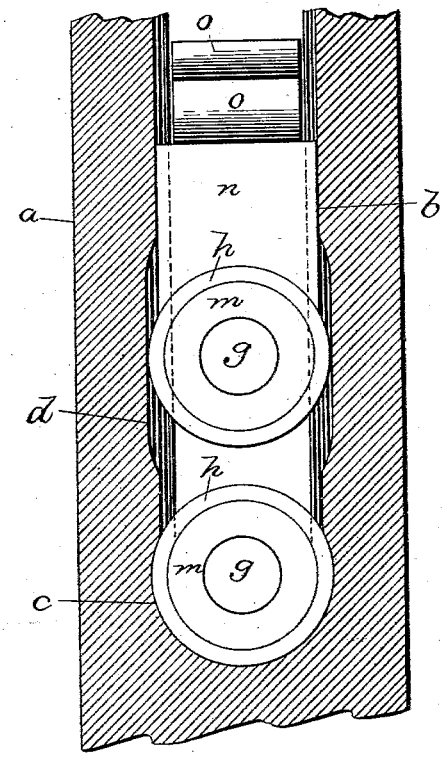
Witnesses
H. F. Meyer
J. M. Fowler Jr
Inventor
Fredrik Hooker
By Mann & Co,
Attorneys No. 746,963. Patented December 15, 1903.

UNITED STATES PATENT OFFICE.

FREDRIK HOOKER, OF BALTIMORE, MARYLAND.

CLOTHES-WRINGER.

SPECIFICATION forming part of Letters Patent No. 746,963, dated December 15, 1903.

Application filed May 13, 1902. Serial No. 107,097. (No model.)

*To all whom it may concern:*

Be it known that I, FREDRIK HOOKER, a citizen of the United States, residing at Baltimore, State of Maryland, have invented certain new and useful Improvements in Clothes-Wringers, of which the following is a specification.

This invention relates to clothes-wringers; and its object is to provide a clothes-wringer in which roller or ball bearings may be employed for the shafts of the wringing-rollers and be protected from the moisture incident to the use of the device, so that the said bearings will be kept in good condition and free from rust and not rust or otherwise injure the clothes.

The invention consists of certain constructions and arrangement and combination of parts hereinafter fully described and claimed, reference being had to the accompanying drawings, in which—

Figure 1 is a front view of a wringer embodying my invention, one of the standards being partly broken away to better illustrate the construction. Fig. 2 is a transverse sectional view, on a larger scale, of one of the standards, illustrating the bearings and their protecting-washers. Fig. 3 is a horizontal sectional view of one of the standards, the section being taken through one of the bearings.

The wringer illustrated in Fig. 1 of the accompanying drawings is provided with two vertical standards $a$, each of which is provided with a vertical slot $b$, forming two uprights to each standard. The slot $b$ is provided at its lower end with a reamed-out partly-circular portion $c$ and a vertically-elongated reamed-out portion $d$ above and spaced from the lowermost reamed-out portion $c$, and the uprights formed by the slots $b$ are provided in their opposing faces with grooves or recesses $e$.

The two rubber rollers $f$ of the wringer are provided at opposite ends with shafts or gudgeons $g$, which are mounted to rotate in antifriction-bearings. Each of said bearings comprises in the present instance a cylindrical sleeve $h$, mounted in a reamed-out portion of the slot $b$, and a cylindrical inner collar $i$, which latter is mounted within said sleeve $h$ and is provided with ball-races, antifriction-balls $j$ being interposed between said sleeve and collar and running in said races in contact with a beveled bushing $k$, which fits within the outer sleeve $h$ and is held rigid by pins $l$ or the like. The inner collar $i$ is shorter than the cylindrical sleeve $h$, and two washers $m$, preferably of rubber, are fitted one within each end of the said sleeve, as shown in Fig. 3, whereby to exclude moisture from the balls. These washers are secured to the inner walls of the sleeve $h$, at the ends thereof, preferably by insoluble cement.

The gudgeons of the rubber rollers $f$ pass through the washers $m$ and are fitted in the rotatable inner collars $i$, and the said washers fit tightly within the outer cylindrical sleeves $h$ and extend over the ends of the inner collars $i$, as seen in Fig. 3, thereby effectively excluding moisture from the antifriction-balls $j$.

The two sleeves $h$ of the lowermost rubber roller $f$ are secured in place between the two pairs of uprights, preferably by being inserted from the top of the slot $b$ and forced into the lowermost partly-circular reamed-out portions of the slot, as shown in Fig. 2, said latter reamed-out portions being of just sufficient size to receive said sleeves and to prevent them from moving vertically, and the sleeves $h$ for the upper roller $f$ are also fitted in the same manner within the upper reamed-out portions $d$, but are capable of limited vertical movement within said portions.

Within the grooves $e$ and above the bearing-sleeve for the upper roller $f$ are mounted two pressure-blocks $n$, each provided with a lower concave side fitting on the top of said sleeves, and the pressure-beams $o$ bear down upon said blocks and can be adjusted by the hand-screws $p$ to increase or lessen the pressure between the two rubber rollers.

Having thus fully described my invention, what I claim as new, and desire to secure by Letters Patent, is—

A clothes-wringer, provided with standards having vertical slots which form two uprights for each standard and each of said uprights being provided in that face which is adjacent to the other upright with recesses; wringing-rollers whose shafts are provided with ball-bearings mounted in said recesses; and washers fitting around said shafts, one at each side of the ball-bearings and forming closures for the ends of the latter whereby to exclude moisture from the balls, as set forth.

In testimony whereof I affix my signature in the presence of two witnesses.

FREDRIK HOOKER.

Witnesses:
CHARLES L. VIETSCH,
FREDERICK S. STITT.